Aug. 4, 1931.     L. R. WILLITS     1,816,993
BATTERY WATER LEVEL INDICATOR
Filed Oct. 25, 1928
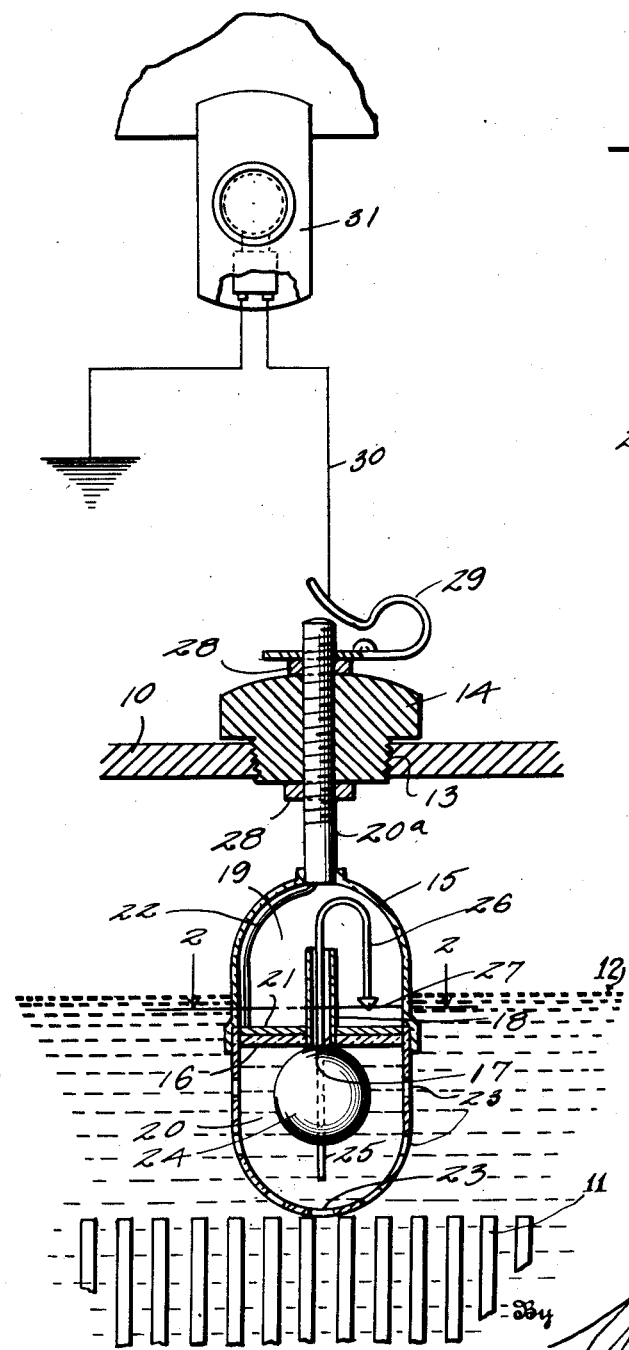
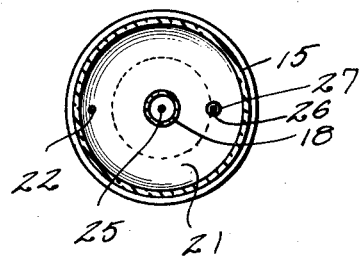
Inventor
L. R. Willits
By Watson E. Coleman
Attorney Patented Aug. 4, 1931

1,816,993

UNITED STATES PATENT OFFICE

LELAND ROSS WILLITS, OF ATLANTIC CITY, NEW JERSEY

BATTERY WATER LEVEL INDICATOR

Application filed October 25, 1928. Serial No. 314,985.

This invention relates to a battery water level indicator for use in conjunction with the storage batteries of automobiles, and more particularly to a device for closing the circuit of a signal when the level of the battery fluid recedes to a predetermined point.

An important object of the invention is to provide a device of this character which may be very readily installed in the battery, which is capable of application to any storage battery, and which may be very readily and cheaply produced.

A further object of the invention is to provide in a device of this character a construction such that it may be adjusted to various levels to meet the situations arising in its adaptation to different types of storage batteries.

These and other objects I attain by the construction shown in the accompanying drawings, wherein for the purpose of illustration is shown a preferred embodiment of my invention and wherein:—

Figure 1 is a sectional view showing a battery water level indicator constructed in accordance with my invention;

Figure 2 is a section on the line 2—2 of Figure 1.

Referring now more particularly to the drawings, the numeral 10 indicates the cover of a storage battery cell, 11 the plates of the cell and 12 the normal water line or level of the battery fluid within the cell. The battery cover 10 has a threaded opening 13 for the reception of a removable cap 14, by means of which the battery fluid is replaced when it reaches a low level. In accordance with my invention, I provide a hollow chamber 15 formed of insulating material and centrally divided by a partition 16 having a central aperture 17 defined by an upstanding flange 18 into upper and lower compartments 19 and 20. The wall of the upper compartment has extending upwardly therefrom a binding post 20a and is imperforate. Upon the partition 16 is seated a contact 21, which is connected with the binding post 20 by a wire 22. The wall of the lower chamber has apertures 23 formed therein, the uppermost of which is spaced below the lower face of the partition and within this lower compartment is arranged a float ball 24. This float ball has a stem 25 of conducting material which projects through the lower end of the ball and through the upper end thereof and has its upper end directed through the tube and then reverted, as indicated at 26. The lower end of the reverted portion is formed as a contact for engagement with the contact 21, so that when the ball drops within the lower compartment 20 for a predetermined distance, a circuit will be completed through the stem 25 to the contact 21 and thus to the post 20.

The post 20 is elongated and exteriorly threaded and has thereon binding nuts 28 for engagement with the upper and lower faces of the cap 14 about the edges of an aperture formed for the passage of the binding posts. The upper end of the binding post may have applied thereto a wire clip 29 or other suitable means for connecting thereto a wire 30, the opposite end of which connects to a signal 31. The signal 31 is preferably in the form of one and a half volt light bulb and the switch mechanism above described is preferably placed in the cap of the grounded cell of the storage battery, as is clearly shown in the wiring diagram of Figure 1. When the battery water falls to a predetermined level, the agitation of the battery fluid resulting at all times during operation of the vehicle will cause the contact 27 to engage with and disengage from the contact 21, thereby causing intermittent operation of the signal 31 and giving a positive indication of the fact that the level is dangerously low.

Since the uppermost opening 23 is below the partition 16, the water level which is normally above the level of this partition will never reach the partition if held therefrom by the trapped air within the upper compartment and the upper portion of the lower compartment.

Since the construction hereinbefore set forth is capable of a certain range of change and modification without materially departing from the spirit of the invention, I do not limit myself to such specific structure except as hereinafter claimed.

I claim:—

1. A water level indicator for a storage battery cell, comprising a hollow insulating casing adapted to be arranged in the cell, a partition separating the casing into upper and lower compartments, the casing being provided below the partition with perforations to permit the battery fluid to enter the lower compartment, a stationary contact arranged within the upper compartment, a float arranged within the lower compartment, a contact carried by the float and extending through the partition for engagement with the stationary contact when the battery fluid has lowered to a predetermined extent, a binding post secured to the casing and adapted to extend through and be secured to the top of the cell, and an element electrically connecting the binding post to the stationary contact.

2. A water level indicator for a storage battery cell, comprising a hollow insulating casing adapted to be arranged in the cell, a partition dividing the casing into upper and lower compartments and having an aperture defined by an upstanding insulating flange, the casing being provided below the partition with perforations to permit the battery fluid to enter the lower compartment, a stationary contact arranged within the upper compartment upon the partition, a float arranged within the lower compartment, a stem of conducting material carried by the float and extending through said flange and being bent downwardly, the terminal portion of said stem constituting a contact adapted to engage the stationary contact when the battery fluid has lowered to a predetermined extent, a binding post secured to the casing and adapted to extend through and be connected to the top of the cell, and an element electrically connecting the binding post to the stationary contact.

3. A water level indicator for a storage battery cell, comprising a hollow insulating casing adapted to be arranged in the cell and having perforations formed in its wall adjacent its lower end, a stationary contact carried by the casing interiorally thereof and above said perforations, a float arranged in the lower end of the casing, a contact carried by the float and adapted to engage the stationary contact when the battery fluid has lowered to a predetermined extent, an elongated binding post secured to the casing and adapted to extend through the top of the cell, an element electrically connecting the binding post to the stationary contact, and means adapted to secure the binding post to the top of the cell for adjustment in the direction of its length.

In testimony whereof I hereunto affix my signature.

LELAND ROSS WILLITS.